US011023450B2

(12) United States Patent
Flowers et al.

(10) Patent No.: US 11,023,450 B2
(45) Date of Patent: Jun. 1, 2021

(54) SYSTEM AND METHOD FOR SEARCHING, TRACKING, MONITORING AND AUTOMATICALLY REPORTING NEW SEARCH SELECTED DOCUMENTS FILED IN A TITLE ABSTRACT

(71) Applicants: Celia C. Flowers, Tyler, TX (US); Erica A Hallmark, TYler, TX (US)

(72) Inventors: Celia C. Flowers, Tyler, TX (US); Erica A Hallmark, TYler, TX (US)

(*) Notice: Subject to any disclaimer, the term of this patent is extended or adjusted under 35 U.S.C. 154(b) by 0 days.

(21) Appl. No.: 15/939,229

(22) Filed: Mar. 28, 2018

(65) Prior Publication Data

US 2019/0317932 A1 Oct. 17, 2019

(51) Int. Cl.
*G06F 16/23* (2019.01)
*G06F 16/93* (2019.01)
*G06F 16/953* (2019.01)
*G06F 16/955* (2019.01)
*G06F 16/951* (2019.01)

(52) U.S. Cl.
CPC ......... *G06F 16/2358* (2019.01); *G06F 16/93* (2019.01); *G06F 16/951* (2019.01); *G06F 16/953* (2019.01); *G06F 16/9558* (2019.01)

(58) Field of Classification Search
None
See application file for complete search history.

(56) References Cited

U.S. PATENT DOCUMENTS

| | | | | |
|---|---|---|---|---|
| 2005/0209873 | A1* | 9/2005 | Anastasi | G06F 16/2358 |
| 2007/0214120 | A1* | 9/2007 | Niendorff | G06F 16/23 707/999.003 |
| 2008/0270151 | A1* | 10/2008 | Mahoney | G06Q 30/02 705/1.1 |
| 2008/0281646 | A1* | 11/2008 | Morris | G06F 16/235 |
| 2012/0166935 | A1* | 6/2012 | Abhyanker | G06Q 30/02 715/234 |
| 2014/0025548 | A1* | 1/2014 | Serio | G06Q 40/02 705/35 |
| 2016/0034578 | A1* | 2/2016 | Wang | G06F 16/951 707/722 |

* cited by examiner

*Primary Examiner* — Son T Hoang
(74) *Attorney, Agent, or Firm* — Catherine Chesley Goodgion

(57) ABSTRACT

A computer based method of searching for, monitoring for, tracking, and automatic reporting of a title plant filed documents relating to user's selection parameters within a client's area of business, standardizing and categorizing the data in order to easily query the title plant records relatable to the standardized property owner data, continually updating the title plant data with newly filed pertinent documents, and notifying the client if a newly filed pertinent document is detected. The user's selection of search parameters and type of documents monitored are selected by the user. The database is updated frequently, daily if possible, to provide the most accurate search results. Automatic notification of a newly filed selectively identified document is sent to the user in real time.

14 Claims, 3 Drawing Sheets

SYSTEM AND METHOD FOR SEARCHING, TRACKING, MONITORING AND AUTOMATICALLY REPORTING NEW SEARCH SELECTED DOCUMENTS FILED IN A TITLE ABSTRACT

CLAIM OF PRIORITY UNDER 35 U.S.C. § 119

The present Application for Patent claims priority to Provisional Application No. 62/478,037 entitled "SYSTEM AND METHOD FOR TRACKING, MONITORING AND REPORTING NEW DOCUMENTS FILED IN A TITLE ABSTRACT," filed Mar. 29, 2017, hereby expressly incorporated herein by reference.

NOTICE OF COPYRIGHTS AND TRADE DRESS

A portion of the disclosure of this patent document contains material that is subject to copyright protection. This patent document may show and/or describe matter, which is or may become trade dress of the owner. The copyright and trade dress owner has no objection to the facsimile reproduction anyone of the patent disclosure as it appears in the Patent and Trademark Office patent files or records, but otherwise reserves all copyright and trade dress rights whatsoever.

FIELD

The present invention relates generally to a collection of real estate data records contained, organized, and updated in a database monitoring system. More particularly, the present invention is in the technical field of a system and method of searching for, monitoring for, tracking for, and automatic reporting of a title plant filed document related to user's selection parameters within a client's area of business by standardizing and categorizing the data in order to easily query the title plant records relatable to the standardized property owner data, continually updating the title plant data with newly filed pertinent documents, and automatically notifying the client if a newly filed matching document is detected.

BACKGROUND OF THE INVENTION

Landmen, lenders, lawyers, and title insurance companies are a few examples of professionals and entities who examine real property-interconnected activities and determine what events alter real property interests. Defects in title, liens, property transfers, and abstracts of judgment are a few examples of the events, which affect ownership interests and or a mortgage interest. Examining these real property interests requires a search of the title record database in the county where the real property interest lies and or multiple searches of the title record databases across several counties where named individuals live or lived previously, an examination of the search results consisting of recorded documents, and continuous or periodic monitoring by repeating the search and examination process.

Title record databases that are computer based and accessible via the world wide web usually allow queries of standardized title record information based on the searcher's selection of identification information and date of record database update. Many title record database sites permit searchers to select collections of recorded title documents including both owner identification information and property identification information and thereby narrow the displayed results via filters that exclude recorded documents that do not match the selected information requested. The information contained in the resulting query of the title record database search is limited to the documents recorded prior to the date of the search. The information contained in the resulting query of the title record database search is also typically limited to one county per search. If the owner owns property in more than one county, multiple individual searches across all applicable counties are typically necessary to ensure all pertinent records are searched and examined.

Landmen extensively search property records to determine mineral ownership, research title defects, identify liens and mortgages, and prepare detailed ownership reports for Oil and Gas companies. To begin the search, the Landman identifies the pertinent parameters for which to search. These parameters may include but are not limited to names of mineral owners, names of heirs of mineral owners and property specific information. The database used to search these parameters is time stamped based on the latest update of records in the database from the county records. The county property records typically remains the all-inclusive source of documents for the search. The entirety of the searched data from the initial search aids the Landman in determining the status of the mineral estate. When the Landman runs the title search, the resulting documents and report stands as a snapshot in time because the report is limited by the date of the search and the latest database update.

For example, the Landman needs to identify all of the heirs of a mineral estate. The Landman conducts a search on January $1^{st}$ for Joe Smith and the resulting documents are carefully analyzed and categorized. On January $2^{nd}$, the Landman does a new search for Jane Smith and the resulting documents are carefully analyzed and categorized. These searches continue until the sweeping list of heirs have all been searched and properly categorized. In most cases, the list of names searched exists as a mammoth list of current mineral owners and heirs. To complete this heirship search could take days, weeks, months, or even years depending on the size of the estate and size of the tract. As a result, the Landman's ownership report is severely limited by the date of the initial search because the report requires a significant amount of time to complete. The ownership report often is outdated information by the time the Landman finalizes his ownership report.

If the Landman searches Joe Smith on January $1^{st}$, and Joe Smith unexpectedly sells his mineral interests on January $10^{th}$, the Landman has no knowledge of this development because his search ended on January $1^{st}$. The Landman's ownership report was not completed until March $1^{st}$, and therefore now contains inaccurate information because it is limited by the date of the initial search. Therefore, there exists a real need in the art for a system and method for monitoring events or transactions not limited by the initial date of search to produce accurate search results.

Lenders provide a variety of loan options for customers. These loan options include but are not limited to the ability to borrow funds to purchase a property, providing cash for home improvement projects, and providing cash directly to a customer by allowing the customer to borrow against the customer's equity in real property the customer already owns. All of these examples require extensive research on the customer and the prospective real property in order to protect the lender's interest in the lien.

The purchase of a new home with a lender usually requires a title insurance policy. Some other forms of loans do not require a title policy and due to the time and expense of obtaining a policy, these policies are foregone in certain loan situations. When a title policy is not required, the lender orders a title search to evaluate the property and borrower's status to determine loan eligibility. The title search is then performed by searching the property records for both the names of the owners and the legal description of the property. Everything filed of record that matches the search parameters, is included in the title search and evaluated by the lender's borrowing standards of practice. The title search stands as a snapshot of the status of title on the day of the search. The lender analyzes the title search results and uses the title search in the loan application process to determine whether to approve the loan for the customer or deny it.

The problem lenders run into exists in the fact that the title search only represents the title status on the day the search was performed and not on the day the loan is funded. A search that was performed on March $1^{st}$ does not capture any documents filed after that date. The loan process takes a significant amount of time, forcing the lender to obtain an additional updated title searches to capture any new documents found of record after the initial search but prior to funding the loan. Protecting the lender's lien position is key to perfecting their lien and the only true way to determine the lien position is to know the existing liens on the day of funding. Currently, the only way to ensure the title search results are accurate is to repeat the entire title search process prior to closing and funding. Therefore, there exists a real need in the art for a system and method for monitoring events or transactions not limited by the initial date of search to produce accurate search results.

Real estate attorneys depend on title abstracts to do a variety of tasks for their clients when facilitating a transaction. The title abstract is also vitally important to litigation matters when asset protection and asset recovery are involved. A comprehensive search of the real property assets streamlines the evaluation on whether a lawsuit is worth the time and money for the client to pursue. During the title search to evaluate the possibility of filing a lawsuit, the existing liens, judgments, and other lawsuits are explored and assessed in the search results. Based on these title search findings, the client may choose to relinquish the lawsuit all together if the person or property is insolvent.

Lawsuits are costly expenditures and should be continually weighed to determine if the cost of the lawsuit outweighs the benefits. When seeking to enforce a judgment, the attorney searches all property, personal and real, associated with the name of the person in default. The attorney evaluates all of the search results and the decides whether to advise his client to move forward with the lawsuit or seek alternative remedies. Once the suit is filed, the court schedule and pre-trial process takes an additional significant amount of time. During the court process of hearings, motions, and orders, the landscape of the title abstract search results may drastically change.

For example, a significant federal tax lien filed after the initial search conducted would completely change the client's willingness to continue with the lawsuit as it could completely deplete the available equity in the debtor's portfolio. Unfortunately, the asset search conducted prior to the filing the lawsuit without repeating the search on a periodic basis, therefore, the newly filed issues were not discoverable. If the creditor knew about the recently filed Federal Tax Lien, the creditor would not pursue the expense of the lawsuit. Therefore, there exists a real need in the art for a system and method for monitoring events or transactions not limited by the initial date of search to produce accurate search results.

Title Insurance protects and insures policy owners that title to their property is free from all defects, liens, judgments and encumbrances. To issue a title policy, the title company does a thorough search of the property records for any documents filed under both the name of the current owner and the real property itself. As with all of the previously discussed searches, the title search results only display searches up to the date of the search and date of update of the title plant records. Unfortunately, the entire closing process the title company manages can take a considerable amount of time based on what records and documents are found in the title search.

If the title company finds an issue in the title that must be cured before a title policy can be issued, the entire process may have delays that range from a few days to several months and so on. For example, the owners of the property bring a contract to the title company to sell their homestead to move into an assisted living facility. At the time of contract execution, the owners inform the title company that they inherited the property from the wife's mother. After searching the title, there is no legal transfer from the mother to the current sellers so this title issue must be cured in order to cure the title defect and issue a title policy.

The current sellers hire an attorney to cure the issue. In the meantime, an abstract of judgment is filed on the husband due to an unpaid credit card debt. This abstract of judgment attaches to the property and is now a second issue that requires curing in order to issue a title policy. However, the title was only searched after the contract was brought in and has not been updated since. The missing transfer documents from the mother takes months to cure the issue while the title company and sellers have no knowledge of the newly filed curative issue. The title company contacts the buyers and sellers and schedules the closing believing the title issues have been cleared in totality.

When the inherited property transfer documents are complete, filed, and the title company reruns the title search the day before or day of closing, the abstract of judgment issue is finally discovered which creates another delay in closing. If the abstract of judgment was discovered at the time it was filed, it could have been cured or at the very least be in the process of curing, prior to the day before closing. Unfortunately, the late discovered abstract of judgment does not allow the file to close and the curative process to clear the abstract of judgment further delays the closing. Therefore, there exists a real need in the art for a system and method for monitoring events or transactions not limited by the initial date of search to produce accurate search results.

SUMMARY OF THE INVENTION

The present invention is an Internet based computer-implemented system and method of searching, monitoring, tracking and reporting a collection of database records. More specifically, searching recorded title documents across multiple counties in one search by selecting search parameters of owner identification information and or property legal description identification information in order to track and monitor the events associated with the property owner name or legal description identification information. These monitored activities include but are not limited to searching owner identification information alone, searching property legal description identification information alone, searching both owner identification information and property legal description identification information in the same search, searching one county's records, or searching multiple counties records in one search, and searching cross-referenced owner identification information and property legal description identification information with one or multiple counties records. Using the initial selected search parameters as the baseline for the search criteria, as the database updates, the baseline selected searched parameters search and monitor all newly filed documents. When the monitored activities discover a new document not found in the previous search that matches the selected search parameters, an automatic notification is generated that notifies the user.

The present invention consists of the front end of the system, the back end of the system and the automatic monitoring notification system. The front end of the system is a collection of recorded title data gathered from public records title database and organized into searchable categories of records as a collection of database records. The back end of the system indexes the data into searchable records and applies an algorithm based on search parameters selected by user to produce search results. The front end of the system and back end of the system work together to collect, search, monitor, and track the collection of database records. The notification method or system utilizes both the front end and back end of the system by saving the search results and search parameters in order to monitor and track these saved search parameters as more database records are added to the collection of records. When a newly added record matches the search parameters used in the initial search, an automatic monitoring notification sends the user notice that a new matching record exists.

The present invention greatly increases the searching capability of existing database records while saving time and improving efficacy in search parameters by allowing the user to search multiple county databases in one user-friendly search. Database records are usually organized and categorized based on the individual county where the property is located. Searching by property description is not limited in this situation because the search only needs to abstract records from the situs county. However, if the property owner owns real property in other counties, multiple searches for each individual county are necessary to pull all of the records associated with the property owner when searching by property owner name identification. Multiple searches also means multiple title search reports to analyze and compare in order to fully examine the desired search results. Without searching across multiple counties, it is likely to miss an important property interest altering recorded document when using property owner name as the search criteria.

Searching by property owner information is limited by traditional searches where records are indexed and categorized by each individual county. An important recorded document that changes legal title filed in one county but not filed in another county would be missed searching by traditional methods. For example, an Affidavit of Heirship determining the heirs of a deceased property owner filed in one county but not filed of record in another county would not be discovered in the traditional county specific search. The present invention allows the searcher to search across multiple counties in one search by both the property owner's name and property legal description thereby eliminating multiple searches to search each individual county's records.

The present invention also allows the search parameters in the initial search to continue to search for additional documents filed in the county or counties designated in the original search and then automatically notifying the user of newly filed pertinent documents. The present invention not only eliminates the need to do a secondary manual search for newly filed documents, but also eliminates the need to do multiple secondary manual searches for each county that may contain essential documents. The present disclosure provides solutions these problems by (1) eliminating expensive and time-consuming secondary manual searches, (2) eliminating the need to do multiple searches across multiple counties along with multiple secondary manual searches and, (3) providing automatic notice of potential predetermined actives that affect the property owner and or property itself.

In more detail, the user runs an initial search based on user's selection of search parameters. After the initial search is complete, these search parameters saves, indexes, and continually monitors the selected owner identification information and or property legal description identification information for newly filed titled documents that directly affect the property and or owners. The original saved search automatically filters and searches newly filed title documents that would have been pulled in the previous title search if they had been filed at the time of the initial search while ignoring those documents that does not match the saved search criteria.

If a new document is filed that matches the parameters in the original search, a notification is automatically sent to the user giving notice of the newly filed matching document along with a hyperlink to review the matched document. The saved search continually monitors newly filed documents that match the saved search criteria until the user turns off the automatic notifications. The user may receive several notifications over a period of time based on how many newly matching documents are discovered. Alternatively, the user may not receive any notifications if nothing new is filed. The amount of notifications will vary on a case by case basis.

For example, a title insurance company runs a title search in the title record database and examines the recorded title documents that touch and concern the real property interest for the subject property at the time of receipt for an order for a new title policy. Prior to closing the transaction, the title insurance company must perform a second search to reexamine any newly recorded title documents filed that affect the subject property prior to closing in order to be in compliance with the insurance regulations and government standards for a title insurance company. Several weeks or months may transpire between the initial search and the final search on the day of closing. The manual second search is another step that delays the closing again that the title company must perform to issue a title policy.

The manual secondary search process could be delayed even further if the processor is behind and working on other files with a higher priority than this file. This delay problematically wastes additional time by stalling the file's progress due to the waiting period for processor to move this file up in queue until it finally arrives at the top of the process list. Here, time is wasted by waiting on the closer to expend time and energy to do a manual second search.

The present method searches automatically for any new documents that potentially affect title and are automatically flagged and sent to searcher whereby continually and automatically performing the second search without wasting time by manually performing the second search. It should be appreciated that the present method saves the title company a precious amount of time and money while increasing efficacy by eliminating the need for the searcher to manually perform a second search entirely. Because the record database is continually searched as new documents are added and the user is notified if a matching record is found after the database is updated, the user is performing a continuous second search after each and every added database record in all of the counties involved in the initial search. The present method also saves the searcher the additional time it would take to perform multiple secondary manual searches in each additional county that was in the initial search, too.

The automated notification of a newly filed document presents in real time to the searching party when the title plant database is updated with the new information. If no notifications are sent to the searching party, then no new documents were filed and no further action is needed. A second search and or multiple secondary searches are eliminated and the title company can close the file assured that all pertinent documents were examined. The present method will greatly decrease the time of processing a file from start to finish by eliminating an additional step to prepare the file for closing.

For example, a lender will run a search on new borrowers who have applied for a loan. The lender typically would search both the borrowers' names and property legal description to capture all of the documents that touch and concern both the borrowers and subject property. At the time of the search, nothing is found that would prevent extending the loan to the borrowers. While the lender is working up the file, the saved search enables the automated notification of a newly filed document to be automatically sent to the lender in real time when the title plant database is updated with new information that would affect the approval of the loan. The search performed when the borrowers applied for the loan is saved and those parameters are still being monitored while the loan officer works up the file.

As the loan officer is processing the loan application for a home equity loan, a Federal Tax Lien is filed against the borrower. This dramatically changes the loan application process for the lender and the borrower's ability to obtain financing because a home equity loan is determined by the value of the property and the amount of equity the borrower has in the property along with other factors. The Federal Tax Lien attached to the property lowers the amount of equity the borrower has in the property and could extinguish the borrower's ability to obtaining a loan.

Without the automatic monitoring in the present invention, the loan processor would work up the entire file without knowledge of the recent event. Appraisals, surveys, and other costly items necessary to fund the loan would also be additional costs the buyer would be responsible to pay even if the loan was not able to fund. As a result, the lender wastes time and money processing a loan that will not be funded and the borrower has the additional costs due and payable in addition to the denial of the home equity loan. Neither party is happy with this outcome. The present method will significantly decrease the time of processing a file from start to finish by immediate notification of a potential issue that allows the lender to address the issue in a timely manner and redirect the course if needed.

Furthermore, the automatic monitoring also proves useful for an after-closing issue that affects the lender's note. Once the borrowers are approved and a new loan is funded, one condition of the loan is that the property may not be sold without the current lien being paid in full. When the borrowers decide to sell the property to their neighbor without paying off the bank's lien, the bank is automatically notified when the deed transferring title to the property is filed that a new document was filed that matches their initial search criteria. This automatic notification eliminates the need for manual additional searches to be periodically run to ensure the terms of the loan are monitored by automatically notifying the lender when a document is filed that matches their initial search terms.

Again, the saved initial search eliminates the need for manual secondary searches to monitor the borrower's activities. Previous methods have included the ability to set up a lien extinguishing search after the loan is funded, but the present method allows the user to set up the search prior to funding the loan and continues to search after the loan is funded. Therefore, again eliminating an additional step in the loan monitoring process. Every step eliminated increases efficacy for the loan officer and lender.

Another example is a Landman performing a mineral title ownership report discovers some of the mineral owners are deceased. In order to complete this ownership report, it needs to be determined if those deceased mineral owners have probated wills in the county the property is located or any other county in the state. Prior searchable databases require the searcher to select the county as one of the search parameters requiring several separate searches if the deceased could have documents filed in other counties. In the current searchable database, the searcher can search across several counties in one search eliminating the additional separate searches and separate title reports to examine.

The Landman traditionally puts a date in time on his search on the day the original search was completed. Using the present method, a multiple county search is saved and set up to automatically notify the Landman if anything is filed at a later date. Now, as the Landman continues to labor on the file working up the title report, the title is still being searched for newly filed documents without any effort or time expended by the Landman. His report will include the original search information along with any newly filed documents allowing his search report to be more accurate than if the search was based on the search he completed months ago. As he works on the title report and as new documents are automatically sent to him, he can adjust his report accordingly and present a more accurate report than using the traditional methods. The traditional methods are just a snapshot of the mineral title ownership on the date of search while this new continuous searching method allows the Landman to save time repeating secondary manual searches in order to prevent missing key documents. Using the present method, the ownership report is a fluid, up-to date accurate representation of the mineral estate which is a tremendous advantage using the traditional snapshot method.

Another example, an attorney files a lawsuit to enforce a judgment. Before the suit is filed, all of the facts and financial situation of the debtor is pulled and analyzed. This information-gathering step includes a title search of the entire debtor's real property interest and the current liens or judgments against the property. Because litigation is extremely expensive, careful consideration is given to the equity available in the debtor's assets prior to filing a suit. The benefits of the suit must outweigh the costs. If the title search shows there is equity available to recoup the debt owed, then the suit is filed and the litigation ball quickly starts to roll.

Preparing to file the lawsuit, researching the debtor's financial situation, and drafting all of the necessary documents to file in court all takes time and money that should be figured into the true cost of the suit. If there is a marginal amount of equity involved, then any additional lien or derogatory situation that occurs affecting the debtor's equity, may be enough to forgo filing suit. The title search is performed in the initial stages of the potential lawsuit and that information is analyzed. The client makes the decision to file suit based on the information known at that time. As the case progresses and time passes, there is a likelihood that other liens could be filed which would change the direction the client would like to pursue. Therefore, to get a true picture of the situation all the way from the start of the lawsuit until the trial, the title needs to be continually searched to obtain a truly accurate landscape of the debtor's financials.

The present method allows the attorney to search the property records in the decision making step of whether to file a lawsuit or relinquish the option and continually search the property records for any additional documents that could later reverse the decision to continue with the lawsuit. Not only is filing a lawsuit costly, but the actual trial is even more costly. Prior to trial prep, if the attorney is made aware of a newly filed document that will likely reverse the client's preferred course or the outcome of the case, the client can make an informed decision on whether to continue with the suit or dismiss the suit without the additional trial expense. The present method will significantly improve the overall outcome of the case by immediate notification of a potential issue that allows the attorney to address the issue in a timely manner and redirect the course if needed.

DETAILED DESCRIPTION

Figure 1:
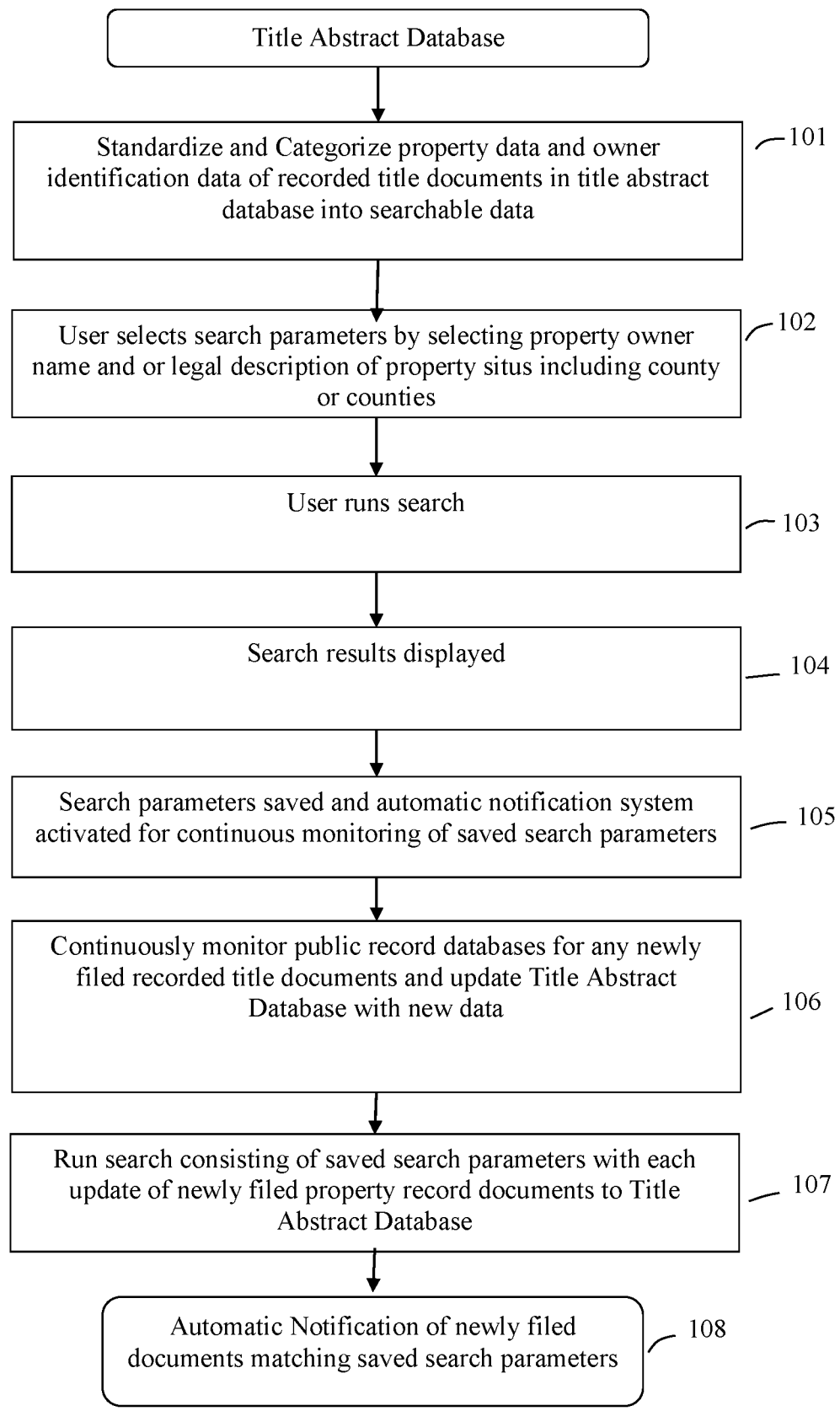
FIG. 1 is a flowchart embodiment of the search and monitoring system method of the present invention.

The present invention provides a method or system for searching, monitoring, tracking, and reporting recorded title abstract documents that affect record title owners and a property's legal description as selected by user. The present invention provides a searchable title abstract database to select and examine all pertinent documents to detect activities defined by user. The information is searched to determine record title, lien events, judgment events and any events that affect owner information and or property information as desired by user. The search results and search parameters are then saved to allow continuous monitoring of desired search parameters. When a new event is detected, the present invention provides useful information to user well in advance of a secondary manual search of the same search parameters.

It should be appreciated that the present disclosure may be used for any type of industry interested in real property records and monitoring real property records. It should also be appreciated that the present disclosure searches for any property records that affect record title, attach liens or judgments to property, or simply touch and concern the owner or property itself. Property records may be any documentation relating to a specific legal description or a property owner. Property records may be any documentation in one specific county affecting one specific legal description or across several counties affecting one person.

Before a search can be conducted, the user must provide basic search parameters so that a search can be carried out to retrieve all of the pertinent property records so that an accurate evaluation can be ascertained. In the present application, the term "Title Abstract Database" consists of all of the property records for a county's recorded property records as contained at the courthouse. It should also be appreciated that the user may select more than one county to search on a single search. The database is categorized, sorted, and searchable by county but is not limited to a single county search.

The title records searched may be specific information provided by user, e.g. property owner's name, legal description of property, county or counties to search, entity name, subdivision name, or the search may be a combination of any or all of the above information which is then saved in the system for monitoring. The search may be as broad or narrow as the user prefers. The more search parameters included in the search, the more narrow the results. Typically, the more narrow the results increases the probability of weeding out unnecessary search results.

The systems and methods disclosed herein provide for searching, tracking, monitoring, and automatic notification of record title altering events according to search parameters set by user. In the previous examples discussed, lenders, title companies, Landmen, and attorneys all have different reasons to search and monitor record title activities. Each of these professionals or entities have different individual reasons for their need to obtain a reliable search of a county or counties title records, but every one of the individual search needs may be performed and met by the present invention. Additionally, each of these professionals or entities have different individual reasons for the need to continue to monitor any newly filed property records that match the initial search criteria, and each of these monitoring reasons may be performed and satisfied by the present invention. The non-exhaustive list of examples previously discussed detail how the present invention is a reliable search method that allows the initial search parameters to deliver precise search results across multiple counties.

The present invention allows the user to select personalized search parameters across multiple counties, performs the search, produces search results, saves the search parameters, continuously updates and monitors the initial search parameters as new documents are added to the database, and automatically notifies user of newly filed matching title documents. To date, there is no other search system and method that allows the user to combine the initial search defined by user's search parameters and continually monitor the same database for any updated recorded title documents that would have been selected in the initial search if they were filed when the initial search was performed.

The present invention eliminates the need for a secondary search to obtain updated information because the secondary search is automatically performed every time the title abstract database is updated with newly filed documents. As previously outlined, the present invention allows the closer's initial search to continue as the file is worked up for closing so that when the file is ready to close, the closer does not have to manually perform a secondary search of the property records to check for newly filed documents after the initial search.

The present invention continually monitors and runs the secondary searches automatically without any input from the closer. The manual secondary search is eliminated entirely by the present invention, additionally solving the problem of further delay in closing due the last minute discovery of an issue that must be addressed prior to closing. If a curative issue presents during the time the closer is working up the file and it is being monitored by the present invention, it will be addressed timely. The present invention dramatically improves the efficacy of the closer's time and productivity.

As previously outlined, the lender orders a title search to determine if a borrower is eligible to obtain a loan. The title search is used to determine the amount of equity in borrower's property. At the time of the search, the lender reviews the initial search with it's selected search parameters and determines the borrower meets the criteria to begin the loan application process. As the lender begins to work the loan application, a newly filed document changes the outcome of the loan process. Using traditional methods, the lender would not be made aware of the newly filed document until the secondary search is run after extensive work and time of the lender's has been invested in the file. The document is discovered at the final hour using the old methods.

Using the present invention, after the initial search results are reviewed, the lender's selected search parameters are saved and continuously monitored while the lender works up the file. When the newly filed document is recorded, the lender is notified. The lender can either put the file on hold or cancel the file until the situation is resolved which frees up the lender to move to another file that is ready to fund. The present invention not only saves the lender time and money on a file that may never close, but also provides the knowledge necessary to make essential business decisions.

As previously outlined, the Landman performs title searches and produces mineral ownership reports. The initial search performed begins the research and information needed to begin analyzing the recorded documents to determine the true owner of the minerals is to date. Because the magnitude of documents retrieved in mineral title search is typically a voluminous amount of data, the report may take the Landman weeks to months to complete.

While the Landman is examining the results of the title search data, a newly filed title document is recorded that will dramatically alter his report. Using traditional methods, the initial search is the only search used to determine mineral owner, which produces inaccurate results when the report takes any amount of time to compile and finalize. The report is dated on the date of the search that could be several months old. The present invention allows the Landman to produce a more accurate and useful ownership report because his search, when finally produced, is up to date rather than several months old. As he works on his report, the present invention continually searches the original database in addition to subsequent secondary searches as the database is updated based on his initial search parameters and notifies him of any newly discovered title defect or alteration. He is able to include and update his report based on the new information giving him the most accurate mineral ownership report on the date of the final report.

As previously outlined, attorneys seeking to enforce a judgment usually monitor activities that affect the equity of a debtor. Determining whether to file a lawsuit typically includes a title search to evaluate the debtor's assets and liabilities. The initial search may show the debtor has property in multiple counties the creditor did not know existed when searching by the traditional method of county specific searches. Using the present invention, the attorney may search the debtor's name across several counties and obtain additional assets to seek enforcement. Moreover, other creditors may file liens or judgments while the attorney is analyzing the information to file a lawsuit or after the lawsuit has already been filed.

Detrimentally, a new lien filed essentially wipes out the equity in the debtor's assets which would have changed the attorney's recommendation to file suit in the first place. The saved search parameters of the initial search, produces this pertinent information needed to determine how the attorney and his client want to proceed because it continually monitors the debtor and the filed documents that affect the debtor's assets and liabilities. Using the present invention to monitor the assets gives the attorney the whole picture on the debtor's assets that would be missed using the older methods of title search capabilities.

In order to capture the newly filed documents, the attorney would have to obtain a secondary search and or searches. Searching the records when determining whether to proceed with a lawsuit, searching again as the attorney prepares the necessary documents to file the lawsuit, and searching again before the trial begins would be necessary times to again evaluate the costs versus the benefits of continuing with the lawsuit. The present invention eliminates the need for a secondary search of the debtor prior to trial saving the attorney time and the client money. Additionally, the present invention timely informs the attorney of any filings that affect the outcome and profitability of the client's lawsuit timely and automatically.

Referring now to the invention in more detail, shown in FIG. 1 is a flow chart depicting a method for searching recorded public records database, monitoring, tracking, and automatic notification of newly filed property record documents that match user's selected search parameters. Method may be executed as a series of automated instructions stored in memory as software, hardware, or combinations thereof, executable by a user, controller, processor or processing device. Method in FIG. 1 may be performed using a computer system or using a network of computers, such that one step of method may be performed by one computer and another separate step may be performed by another computer at another location. Method in FIG. 1 may describe and list tasks performed automatically as a service for a subscriber or client.

Method in FIG. 1 begins with the Title Abstract Database that is a collection of county property records or a collection of multiple county property records copied from the county property records and scanned into an electronic readable format. In step 101, the county or counties electronic property records are standardized, sorted and categorized into a searchable format. The database may include title records or information of all the real property records within a county, a state, a region, a district or nationally. The database may also include records or documents specific to the user's industry not filed of record in the real property records. The database may be in communications with one or more terminals. The terminals represent data input sources, which may communicate with and provide updates to the database. The database may be programmed to update and store property records.

The sorted data in step 101, can be categorized by property owner name, legal description, type of document filed, county of record, subdivision information, and recording information to name a few examples. The type of document filed examples are Warranty Deed, Deed of Trust, Abstract of Judgment, Lien, Affidavit of Heirship, Federal Tax Lien, State Tax Lien, Affidavit of Fact, and Homestead Designation to name a few examples. Each of these designations aids the user in knowing if the document is pertinent to their data use. User can also add additional designations to further customize the search results for the user.

Step 102 allows the user to select search parameters by selecting property owner information, legal description of the property, county to search or multiple counties to include in the search. The user may select one search parameter such as property owner name and complete the search. Alternatively, the user can select a plethora of search parameters and complete the search. For example, the user can select property owner name and three specific counties to focus on the information regarding the property owner, which is not limited to one county or specific property legal description. This search would produce any document pertaining to that searched name independent of legal description in all of the counties designated by user.

On the other hand, step 102 allows the user to choose to select search parameters pertaining only to a single specific legal description in a specific county and complete the search. This will generate results specific to the legal description not connected to any property owner name. The search will produce all results for that legal description regardless of property owner name. These examples are for illustration purposes only and in no way limit the varying search options.

Once user selects search parameters in step 102, the user is ready to run the search in step 103. The system searches all of the available records in the database against the 102 search parameters. The system ignores the data that does not match the 102 search parameters while the system pulls the documents 103 that match the 102 search parameters and produces the user search results 104. The results are displayed 104 on the user's computer, laptop, or any electronic device capable of utilizing the world wide web.

The user can then print, save, sort, deselect documents, or abandon the 104 search results displayed. If the user choses to save the search, the search parameters and automatic notification system 105 is automatically activated for continuous monitoring of newly filed documents that match the initial search parameters. The user will now receive automatic notifications of newly filed documents without having to run a secondary manual search. If the user chooses not to save the search 105 but delete the findings or begin a new search 102, the search parameters are deleted and the automatic notification system is not activated. The user will not receive any additional notifications concerning the unwanted search.

If the user chose to save the search 105, the database will continue to monitor the search parameters defined by user 106 by researching the database every time a new document is added to the database. The system in step 106 continuously monitors the user's search parameters without any additional effort needed from the user. The initial search parameters 102 are saved and utilized repeatedly as documents are added.

As the database continues to discover and update the database with new documents, the saved search parameters continue to monitor the user's search data 106 with the newly filed documents. As the database is updated, 106, the automatic secondary searches continue to be performed on the abstract database 107. The database runs the search consisting of saved user search parameters with each update of newly filed property record documents in the Title Abstract Database 107.

As new documents are filed and added to the title record database 106, the newly filed documents are automatically searched 106 and filtered by the selections made by the searcher in the original search 107. If there is a match from the newly added documents, the user is automatically notified of the matching document 108. If the documents do not match the user's search parameters 102, no notification is sent. The user is not notified every time the database is updated 108. The user is only notified when the databased is updated, and a document matches the user's selected search parameters 102. If the newly added document would have been filed of record when the initial search was performed 103, the document would have been displayed in the initial search results 104. The automatic notification 108 simply sends the newly filed matching documents to the user and does not resend the initial search results 104. Sending only the new matching document 108 saves the user time to not have to reexamine the initial search results 104 to discover which document was newly filed. The user may then review the newly added documents by clicking on a hyperlink to the document 108.

Figure 2:
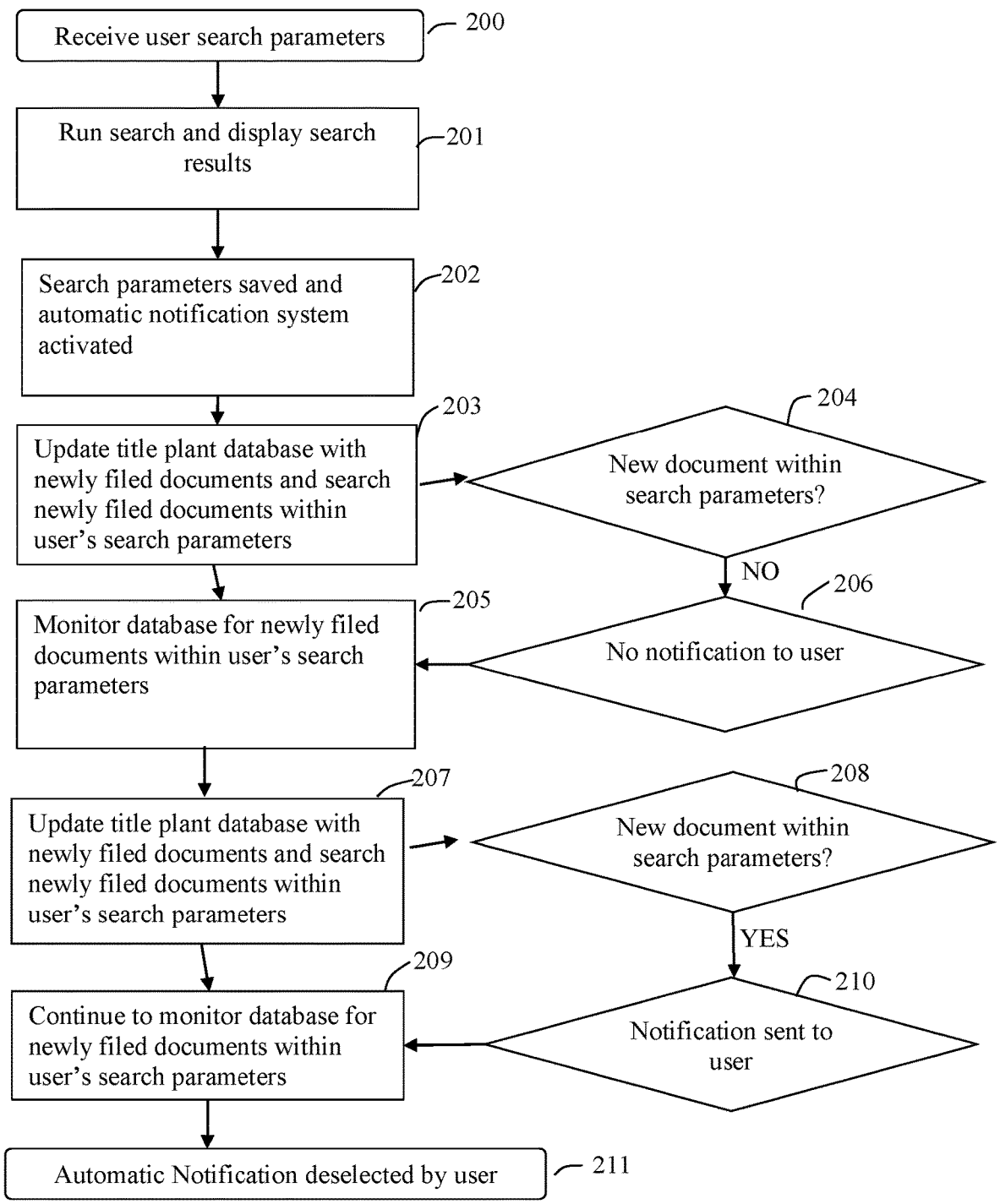
FIG. 2 is a flowchart depicting a method for monitoring for and reporting searched document events according to an embodiment of the present invention.

Referring now to FIG. 2 wherein the steps of a method of the present invention are shown in a flow chart, the method begins with user selections as search parameters in the title abstract database 200. The user select the search parameters 200 based on their own criteria and desired search results. The user may set up a search with similar criteria to run several searches at one time with one search. For example, the user may select "Smith County", "Smith Subdivision", and "Longview Subdivision", and then the system will pull every document that touches and concerns both "Smith Subdivision" and "Longview Subdivision" in "Smith County." The results may be manually sorted by the user to determine the desired results 201 if needed.

Once the user selects the desired search parameters 200, the database system locates and matches all documents that match the search parameters 201. The user can see the matching documents in a web browser 201 that lists the matching documents individually. If the user desires to review the documents, the user can click on the screen to review all documents 201 and the entire resulting data file is pulled for the user. The user can then save, print, or view the results individually or as a report of all of the matching documents. If the user desires to review one document at a time instead of the entire resulting data, the user simply selects the document he would like to review and the document will open in readable format. The single document then can also be saved, printed or viewed with ease. These two steps are shown for purposes of illustration only, and are not intended to limit the present invention to merely two steps. A method according to the invention may employ one or more processing steps as needed or desired.

In another embodiment, the user can select certain document types 202 during the initial search to further narrow the results. Or, if after the first search, an unmanageable number of documents are matched in the database, the user can select additional search parameters 202 and begin another search 201. The additional parameters will search the results from within the initial search results. If the user desires, the user can also delete the search entirely and begin a new search.

Once the user determines the desired search parameters 200, runs the search and views the displayed search results 201, the user may save the search which automatically activates the automatic notification system 202. All or a portion of the search parameters 202 may be performed automatically as a service to the user, e.g. lender, title company, Landman, and attorney. The method may proceed into one or more processing steps 203, 204, 205, 206, according to the results of the secondary search performed when the title plant database is updated with newly filed documents. These two steps are shown for purposes of illustration only, and are not intended to limit the present invention to merely two steps. A method according to the invention may employ one or more processing steps as needed or desired.

In step 202, one or more search parameters for public records may be monitored for documents that alter ownership information and or the property itself, for example. During this step, for instance, owner's name and owner's property description are used in the initial search and become the saved search parameters. In the decision step 204, if after the title plant database is updated and no matching new document is identified, then the user does not receive any notification 206. When there is no notification, there is no communication at all with user. The saved search parameters are still saved and continue to monitor the title plant database. Continuation of the monitoring step 205 may occur every time the title database is updated.

In step 207, after no new notifications were found in step 203, the search parameters continue and loop to the next monitoring event. The same step in search 203, is repeated again in step 207. The same owner's name and owner's property description used in the initial search are used repeatedly to continually monitor the database for newly filed documents that match user's search parameters.

In step 207, the title plant database again updates with newly filed documents and the user's search parameters are used to run the search for matching newly filed documents. The system identifies if any new documents 208 not contained in the initial search are found in the updated search. If there is a matching newly filed document, the user receives a notification of the newly filed matching document. The user receives notification along with a hyperlink to the actual newly filed document so the user may review the document. The saved parameters used in the search continually monitor newly filed documents that match the saved search parameters until the search is turned off. The continuous loop of monitoring does not end until user manually ends the monitoring and tracking process.

Figure 3:
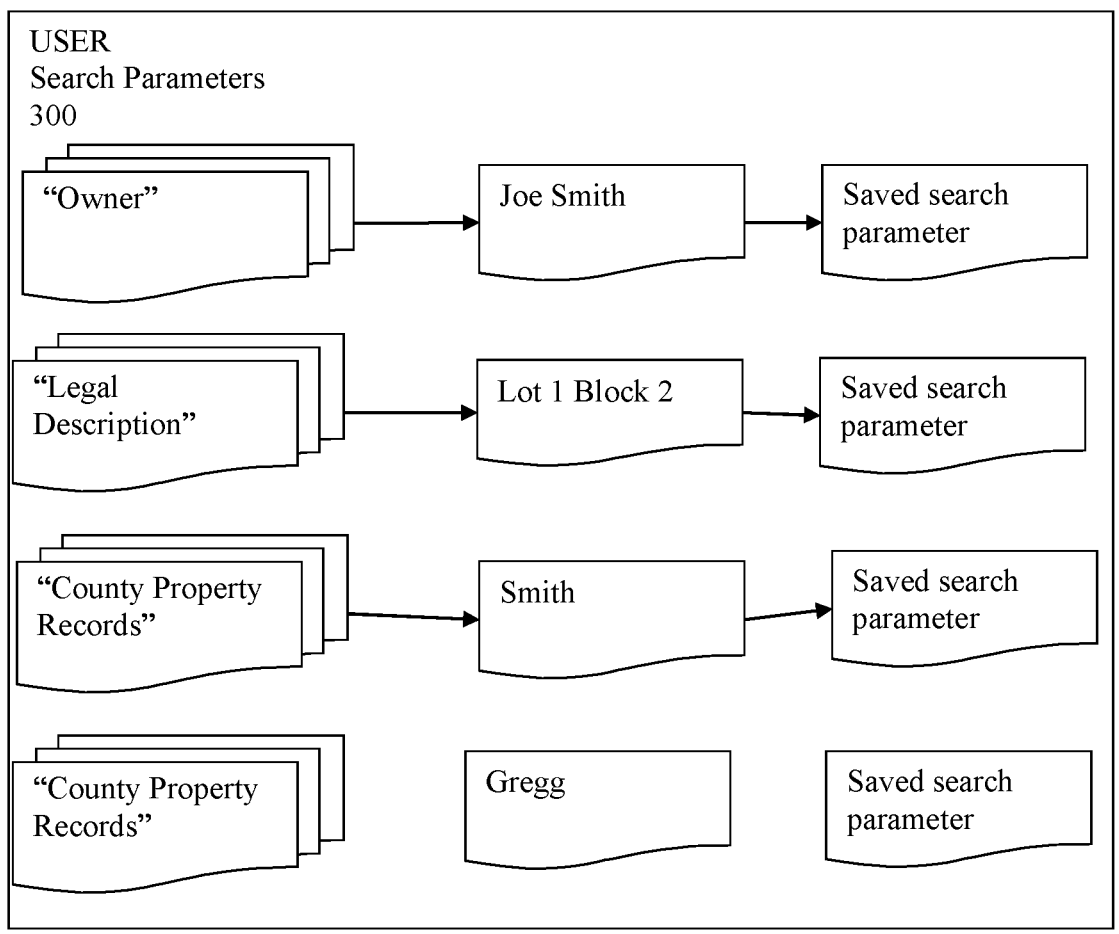
FIG. 3 illustrates examples of search parameters selected buy user.

FIG. 3. Illustrates one possible embodiment of user selected search parameters on which the initial search will search and generate the title report. These same search parameters used in the initial search are saved and used to monitor the recorded title documents as they are added to the database to update the records. When a new document is filed, these search parameters determine if the document affects the search parameters and provides the filter for monitoring all newly filed documents in the title abstract updates.

In one embodiment, the Landman who is close to completing his mineral title report receives an automatic notification that one of his mineral owners has transferred his mineral rights via a Mineral Deed to a third party. The Landman receives the notification and clicks on the hyperlink to review the name of the third party who is now the mineral owner that should be included in his mineral owner title report. If the Landman was not using the present invention, his report would be inaccurate and could cost the Landman and Landman's client a significant amount of time and money discovering later that the ownership report was incorrect. Utilizing the present invention, the Landman is able to include the updated information with his report so when he is report is delivered to his client, it is accurate and up to date. Using the old traditional methods, his inaccurate and outdated report would be completed and delivered several months after his completed initial search.

The monitoring steps are repeated each time the title database is updated. The database may be updated as frequently as possible but at minimum follow the title plant rules and regulations title companies must follow. These monitoring steps continue until the user stops the notification search 211 and alerts.

Other methods and systems currently on the market monitor the county property records at the frequency set up by user. This infrequent monitoring without pattern or with an infrequent pattern produces subpar results. For example, the problems associated with filed documents that significantly affect a lender's interest in a borrower or property in determining whether to make a loan, must be delivered in real time in order to save essential time and lender resources. The lender only profits from loans that fund. The lender does not profit from working up a file and spending vast amounts of time on a loan that is never going to close due to a property-altering event after the application is filed and the initial search is reviewed. Using the present invention to continually monitor the title record database in real time greatly increases the lender's efficacy and solves a significant problem for the lender processing a loan application because the lender can put the file on hold or deny the application immediately when a course altering document is discovered.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed. The invention has been disclosed in an illustrative style and the terminology used throughout should be read in an exemplary manner rather than limiting manner.

It should be noted and understood that various changes and modifications to the described preferred embodiments herein will be evident to those skilled in the art. Such changes and modifications can be made without deserting from the spirit and scope of the present invention and without weakening its intended advantages. It is therefore intended that such changes and modifications be enclosed by the appended claims.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A computer-based method of monitoring a title abstract database, comprising:
  receiving user selected search parameters related to a property from a client;
  storing information in the title abstract database, wherein the title abstract database consists of title abstract documents of at least one county pertaining to transactions affecting the property as contained at a public records database of the at least one county, and the title abstract database is categorized and sorted by the at least one county;
  searching the title abstract database for title abstract documents matching the user selected search parameters;
  generating and delivering to the client a report of the matching title abstract documents;
  saving the user selected search parameters used to generate the report and enabling the client to selectively activate for an automatic notification to update the report;

continuously and automatically monitoring the public records database to search for newly filed title abstract documents;

updating the title abstract database with the newly filed title abstracted documents in the public records database resulted from the search;

running the saved search parameters in response to the updating the title abstract database; and if a newly filed title abstract document related to the saved user selected search parameters is detected in response to the running the saved search parameters and the automatic notification is activated, sending the automatic notification to the client.

2. The method of claim 1, further comprising, if no newly filed title abstract document is detected when monitoring the public records database, repeat the monitoring step.

3. The method of claim 2, further comprising repeating the monitoring step each time the public records database is updated.

4. The method of claim 1, further comprising standardizing the user selected search criteria, wherein the standardizing step comprises extracting legal description that describes a location of the property from the title abstract database.

5. The method of claim 4, wherein the standardizing step further comprises extracting individual names or entity name as identification of the property from the title abstract database.

6. The method of claim 1, further comprising generating a notification to the client if a new public records database is detected during the continuous monitoring of the database.

7. The method of claim 1, wherein the public records database is configured to store a plurality of title abstract documents from a plurality of public records databases.

8. The method of claim 1, wherein the title abstract database comprises a plurality of individual databases in communication with each other via a network.

9. A system for monitoring a title abstract database including a processor and a memory in communication with the processor, the system comprising:

computer readable logic stored on the memory and executable by the processor, the computer readable logic configured to:

receive user selected search parameters related to a property from a client;

store information in the title abstract database wherein the title abstract database consists of title abstract documents of at least one county pertaining to transactions affecting the property as contained at a public records database of the at least one county, and the title abstract database is categorized and sorted by the at least one county;

search the title abstract database for title abstract documents matching the user selected search parameters;

generate and deliver to the client a report of the matching title abstract documents;

save the user selected search parameters used to generate the report and enable the client to selectively activate an automatic notification to update the report;

continuously and automatically monitor the public records database to search for newly filed title abstract documents;

update the title abstract database with the newly filed title abstracted documents in the public records database resulted from the search;

run the saved search parameters in response to the updating the title abstract database; and if a newly filed title abstract document related to the saved user selected search parameters is detected in response to the running the saved search parameters and the automatic notification is activated, send the automatic notification to the client.

10. The system of claim 9, wherein the public records database is configured to store a plurality of title abstract documents from a plurality of public records databases.

11. The system of claim 9, wherein the title abstract database comprises a plurality of individual databases in communication with each other via a network.

12. The system of claim 9, wherein the generated report includes each title abstract document matching the saved user selected search parameters.

13. The system of claim 9, wherein the generated report further includes a hyperlink to view the matching title abstract documents.

14. The system of claim 9, wherein the generated notification further includes a hyperlink to view the newly filed title abstract document related to the saved user selected search data.

* * * * *